United States Patent Office 3,000,979
Patented Sept. 19, 1961

3,000,979
ISOMERIZATION OF FLUOROOLEFINS
Hugh Harper Gibbs, Wilmington, Del., assignor to E. I. du Pont de Nemours and Company, Wilmington, Del., a corporation of Delaware
No Drawing. Filed Nov. 12, 1958, Ser. No. 773,169
5 Claims. (Cl. 260—653.3)

The present invention relates to the preparation of perfluoroolefins, and more particularly to the preparation of internally unsaturated perfluoroolefins.

Perfluorocarbon compounds, i.e., compounds containing only carbon and fluorine, and substantially perfluorinated compounds are highly useful industrial compounds because of the chemical inertness and the thermal stability of these compounds. Perfluorocarbon compounds which are normally gaseous are in great demand as propellants; perfluorocarbon compounds which are normally liquid are utilized as heat transfer media, hydraulic fluids, dielectric media, and as solvents; the utility of solid perfluorocarbon compounds, such as polytetrafluoroethylene, is well known and needs no illustration. Stable liquid fluorocarbon compounds can be prepared by the fluorination of hydrocarbons, the decarboxylation of alkali metal salts of perfluorinated acids followed by fluorination of the resulting fluoroolefin, by the pyrolysis of such polymers as polytetrafluoroethylene, or by the pyrolysis of low-boiling perfluoroolefins or perfluoroalkanes, such as tetrafluoroethylene, hexafluoropropylene, hexafluoroethane, etc. Many of the methods developed for the preparation of fluorocarbon compounds give rise to terminally unsaturated perfluoro- or substantially perfluorinated olefins. These compounds are, however, not generally suitable for direct-industrial applications because the terminal double bond causes the compound to be reduced in its chemical inertness and thermal stability. Recently, however it was found that internally unsaturated perfluoro- and substantially perfluorinated olefins have thermal stability which equals that of the saturated fluorocarbon compounds. Hence, methods for the preparation of internally unsaturated perfluoroolefins have become of great technical importance.

It is one of the objects of the present invention to provide a method for the preparation of internally unsaturated perfluoro- or substantially perfluorinated olefins. It is another object to prepare perfluorinated and substantially perfluorinated olefins having high chemical inertness and thermal stability. Other objects will become apparent hereinafter.

In accordance with the present invention, internally unsaturated perfluorinated olefins and substantially perfluorinated olefins are prepared by a process which comprises passing a fluoroolefin having the general formula $$XC_nF_{2n}CF=CF_2$$

wherein $n$ is an integer of greater than one and X is from the group consisting of hydrogen and fluorine, in vaporized form over a catalyst selected from the group consisting of alkali metal, beryllium, magnesium and alkaline earth metal fluorides, at a temperature of 100° to 400° C., and preferably at a temperature of from 200° to 300° C., and recovering an internally unsaturated fluoroolefin. In accordance with the present invention it was discovered that metal fluorides of group I-A and II-A of the periodic table catalyze the isomerization of terminally unsaturated perfluoro- and substantially perfluorinated olefins to olefins in which the double bond is moved from the α- to the β-position.

The catalysts which cause the isomerization of the fluorinated vinyl olefins are the fluorides of metals in groups I-A and II-A of the periodic table of elements (Handbook of Chemistry and Physics, Chemical Rubber Publishing Co., 37th Ed., p. 392), and as such include fluorides of lithium, sodium, potassium, rubidium, cesium, beryllium, magnesium, calcium, strontium and barium. The metal fluorides may be employed as such, or may be employed in combination with other metal fluorides such as potassium ferrofluoride, calcium ferrofluoride, etc. Isomerization of the vaporized fluoroolefin occurs on contact with the solid catalyst at a temperature of 100° to 400° C. Within the preferred temperature range of 200° to 300° C. the conversion of the terminally unsaturated fluoroolefin to the internally unsaturated fluoroolefin to the internally unsaturated fluoroolefin, is generally 90% or better. Little or no by-products are formed so that the products are obtained in great yields. The contact time of the fluoroolefin with the solid catalyst may be as short as 10 seconds, although it is preferred to employ a contact time varying from 1 to 10 minutes to assure contact of all of the fluoroolefin with the catalyst. An inert diluent such as nitrogen, helium or any of the other inert gases may be employed if desirable. Various means known to those skilled in the art may be employed in contacting the fluoroolefin with the catalyst, one of the simplest methods being passing the vaporized fluoroolefin through a tower or column containing the catalyst in pelletized porous form.

The fluoroolefins which are isomerized by the process of the present invention are terminally unsaturated perfluoroolefins having at least 4 carbon atoms and similar substantially perfluorinated olefins which have a hydrogen atom attached to the omega-carbon atom. The length and size of the perfluoro- or substantially perfluorinated radical attached to the trifluorovinyl group does not affect the catalytic activity of the metal fluorides employed to cause the isomerization. However, the vaporization of the higher olefins becomes more difficult with increasing number of carbon atoms in the fluororadical attached to the trifluorovinyl group, and hence the process of the present invention has the greatest utility with perfluorinated and substantially perfluorinated olefins having from 4 to 20 carbon atoms. Representative examples of the fluoroolefins suitably isomerized to internal olefins are perfluorobutene-1, perfluoroheptene-1, perfluorodecene-1, perfluorododecene-1, perfluorooctadecene-1, perfluoro-3-methylpentene-1, perfluoro-3,5-dimethylheptene-1, omega-hydroperfluorononene-1, omega-hydroperfluorohexene-1, omega-hydroperfluorododecene-1, and like compounds.

The process of the present invention is further demonstrated by the following examples:

EXAMPLES I TO XIV

A 12 in. long, one in. diameter "Vycor" glass tube was placed vertically in a 13 in. split furnace. The tube was packed with 3/16 in. pellets of the fluoride salts listed in Table I. A fraction cutter was connected to the top of the "Vycor" tube and a Dry-Ice trap was connected to the bottom of the tube. The tube was heated to a temperature indicated in the attached Table I, and nitrogen carrier gas was passed through the column at a rate of 10 ml./min., corresponding to a contact time of approximately 10 min. A 1.7 g. sample of perfluoroheptene-1 was placed in the fraction cutter and added to the nitrogen stream over a period of 15 min. After all of the olefin had been added, the nitrogen stream was continued for an additional 30 minutes. The sample collected in the Dry Ice trap was weighed and in all instances weighed between 1.5 and 1.6 g. The yield and the nature of the reaction product were determined by infrared analysis and gas chromatography. The extent of isomerization of the vinyl olefin was calculated by the usual peak-area ratio method. In all instances perfluoroheptene-2 was obtained. In general, a mixture of the cis- and trans-perfluoroolefin was obtained, although the trans-form was favored at higher temperatures.

Table 1

| Example | Catalyst | Temp., °C. | Percent of Product Isomerized |
|---|---|---|---|
| I | Sodium Fluoride | 115 | 4 |
| II | ----do---- | 200 | 25 |
| III | ----do---- | 258 | 94 |
| IV | ----do---- | 302 | 94 |
| V | Potassium Fluoride | 200 | 21 |
| VI | ----do---- | 250 | 99 |
| VII | Cesium Fluoride | 282 | 56 |
| VIII | ----do---- | 304 | 100 |
| IX | Rubidium Fluoride | 200 | 51 |
| X | ----do---- | 256 | 99 |
| XI | Potassium Ferrofluoride ($KFeF_4$) | 380 | 100 |
| XII | Magnesium Fluoride | 260 | 89 |
| XIII | ----do---- | 394 | 99 |
| XIV | Barium Fluoride | 200 | 100 |

EXAMPLE XV

Employing the apparatus and procedure described in the preceding examples, omega-hydroperfluorooctene-1 was passed over potassium fluoride for a contact time of 10 minutes at a temperature of 380° C. Infrared analysis and gas chromatography showed a complete isomerization of the olefin to omega-hydroperfluorooctene-2.

It is to be understood that the examples are intended to demonstrate but do not limit the process of the present invention. Various modifications apparent to those skilled in the art may be employed without departing from the scope of the invention.

The process of the present invention provides a simple and economic method for the preparation of perfluorinated and substantially perfluorinated compounds having outstanding chemical inertness and temperature stability. A further increase of the reaction temperature to above the preferred temperature range leads to the formation of an equilibrium between the terminally unsaturated perfluoroolefin and the internally unsaturated perfluoroolefin. This equilibrium, although highly favored towards the formation of the internally unsaturated perfluoroolefin, may also be employed for the preparation of the vinyl perfluoroolefin if a pure internally unsaturated perfluoroolefin is employed.

I claim:
1. A process for preparing fluoroolefins consisting essentially of passing a fluoroolefin having the general formula $XC_nF_{2n}CF=CF_2$, wherein $n$ is an integer of greater than one and X is a member of the group consisting of hydrogen and fluorine, in vaporized form over a catalyst selected from the group consisting of fluorides of metals of groups I-A and II-A of the periodic table of elements, at a temperature of 200° to 400° C., and recovering an internally unsaturated fluoroolefin.

2. A process for preparing fluoroolefins consisting essentially of passing a fluoroolefin having the general formula $XC_nF_{2n}CF=CF_2$, wherein $n$ is an integer of greater than one and X is a member of the group consisting of hydrogen and fluorine, in vaporized form over an alkali metal fluoride at a temperature of 200° to 400° C., and recovering an internally unsaturated fluoroolefin.

3. The process as set forth in claim 2 wherein the alkali metal fluoride is sodium fluoride.

4. The process as set forth in claim 2 wherein the alkali metal fluoride is potassium fluoride.

5. A process for preparing fluoroolefins consisting essentially of passing a fluoroolefin having the general formula $XC_nF_{2n}CF=CF_2$, wherein $n$ is an integer of greater than one and X is a member of the group consisting of hydrogen and fluorine, in vaporized form over a fluoride of a metal of group II-A of the periodic table at a temperautre of 200° to 400° C., and recovering an internally unsaturated fluoroolefin.

References Cited in the file of this patent

UNITED STATES PATENTS

| 2,242,084 | Nicodemus | May 13, 1941 |
| 2,918,501 | Brehm et al. | Dec. 22, 1959 |

OTHER REFERENCES

Miller: Abstract of application Serial Number 47,553, published January 8, 1952, 654 O.G. 632.